UNITED STATES PATENT OFFICE.

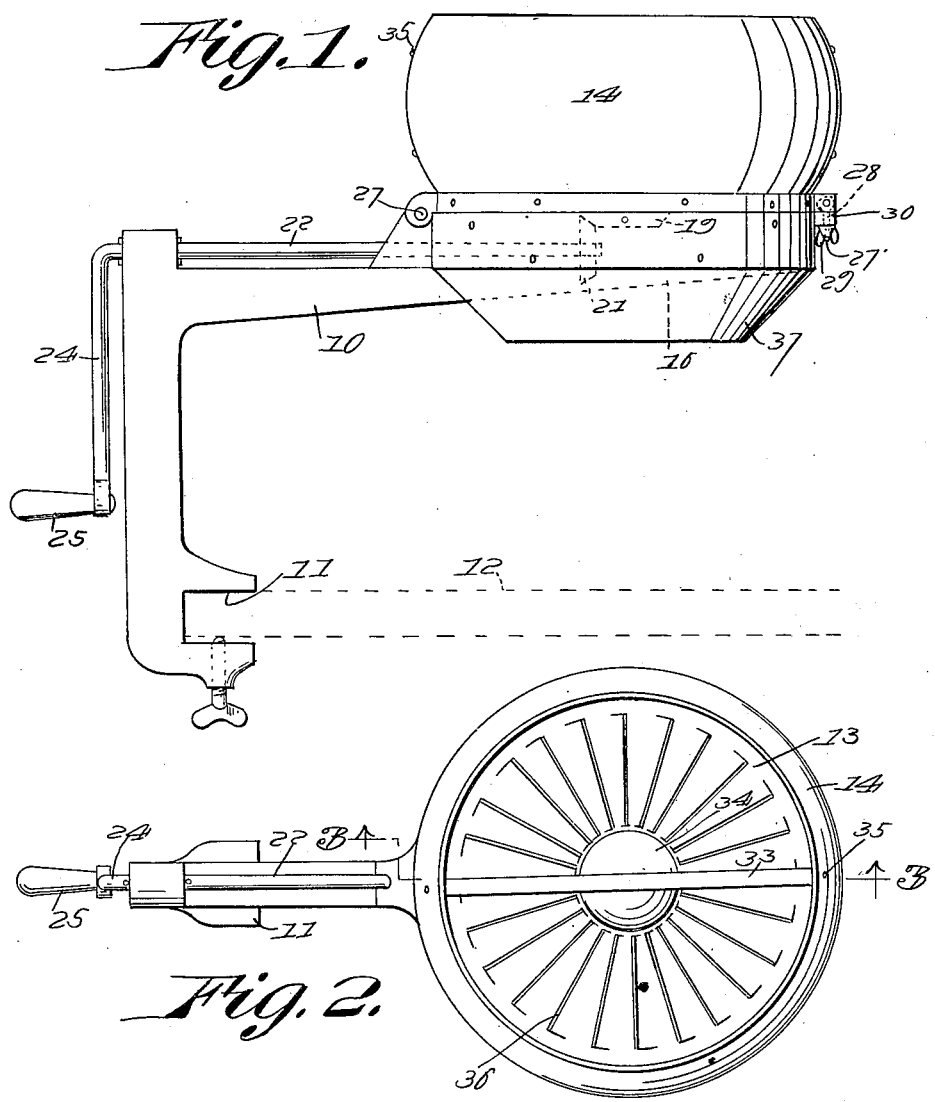

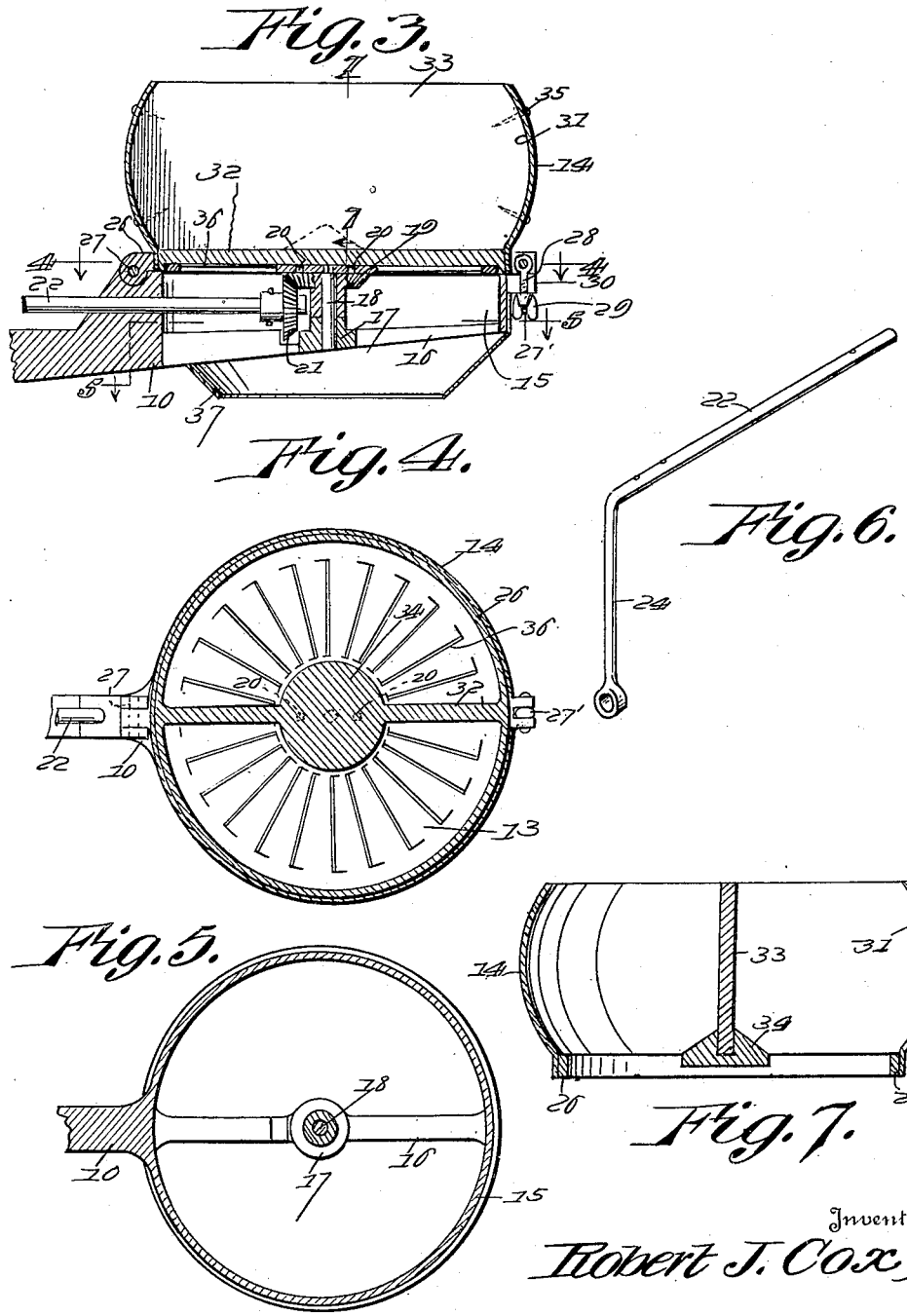

ROBERT J. COX, OF DES MOINES, NEW MEXICO.

VEGETABLE-SLICER.

1,371,865.     Specification of Letters Patent.     Patented Mar. 15, 1921.

Application filed April 1, 1920. Serial No. 370,435.

*To all whom it may concern:*

Be it known that I, ROBERT J. COX, a citizen of the United States of America, residing at Des Moines, in the county of Union and State of New Mexico, have invented new and useful Improvements in Vegetable-Slicers, of which the following is a specification.

The object of the invention is to provide a simple and efficient means for slicing and comminuting vegetables, fruits and the like with the maximum facility and minimum risk of inconvenience or injury to the operator and with a view to avoiding unnecessary waste incident to residue accumulating in the angles or upon fixed portions of the apparatus, and with these objects in view the invention consists in a construction and combination of parts of which a preferred embodiment is shown in the accompanying drawings, wherein:

Figure 1 is a side view of the apparatus.

Fig. 2 is a plan view.

Fig. 3 is a longitudinal section on the plane indicated by the line 3—3 of Fig. 2.

Fig. 4 is a horizontal section on the plane indicated by the line 4—4 of Fig. 3.

Fig. 5 is a similar section on the plane indicated by the line 5—5 of Fig. 3.

Fig. 6 is a detail view of the crank shaft.

Fig. 7 is a detail section of the bowl on the plane indicated by the line 7—7 of Fig. 3.

The apparatus consists essentially of a base 10 preferably constructed in the form of a bracket with a clamp 11 adapted for attachment to the edge of a table, indicated in dotted lines at 12 in Fig. 1, or other convenient support; a rotary cutting or slicing disk 13 mounted upon the base; a feed bowl 14 disposed above the plane of the cutter disk to hold the vegetables or other objects to be sliced or cut; and operating devices for communicating rotary motion to the cutter disk.

As shown in the drawing the base 10 embodies an annular band 15 spanned radially by a brace bar 16 provided at its center with a foot bearing 17 from which rises a spindle 18 upon which is mounted a beveled gear 19 which supports and communicates motion to the cutter disk which is secured to the gear by pins 20. Motion is communicated to the gear by means of a pinion 21 carried by an operating or crank shaft 22 of which the crank 24 is supplied with the usual grip 25.

Foldably mounted upon the base and in concentric relation with the band 15 is a ring 26 pivoted as indicated at 27 to the base and having a securing means shown at 28 to lock it in its normal or operative position, said locking means embodying a pivotal bolt 28 fitted with a thumb nut 29 for engagement with a notched ear 30 on the base. This ring forms the supporting element of the bowl 14 of which the wall 31, preferably constructed of sheet metal or other light material is attached at its lower edge to the ring, and the latter is spanned by a bar 32 upon which rests the lower edge of a division board 33 serving to prevent the vegetables or other contents of the bowl from following or taking up the rotary movement of the cutter disk. The diametrical bar 32 is preferably enlarged at its center to form a spreading cone 34 which covers the central imperforate portion of the cutter disk and means whereby it is fastened to the operating gear 19. The division board or partition 33 may be terminally attached to the wall of the bowl by fastening means indicated at 35.

It will be noted that the cutter disk operates beneath and close to the plane of the cross bar 32 of the bowl and is provided with upturned upstruck knives or blades 36 which are exposed when the bowl is tilted or swung back upon its hinge pin or pivot 27 to provide for cleaning or removing any obstructions tending to interfere with the proper operation thereof or for removing accumulations when the slicing operation has been completed.

Also as a means of efficiently directing the product of the cutting or slicing means to a suitable receptacle, a delivery funnel 37 may be suspended from the base as clearly indicated in Figs. 1 and 3. It will be noted that the gearing by which motion is communicated to the cutter disk is covered and protected from accumulations of material falling from the cutter knives by the overhanging conical deflector 34 provided at the center of the diametrical brace bar carried by the frame of the bowl.

What is claimed is:

1. A slicer for vegetables and the like having an annular base, a rotary cutter disk mounted in the base, operating means for the disk including a driving gear to which the disk at its center is affixed, a bowl pivotally mounted upon the base for movement into and out of operative relation with the cutter disk, and a diametrical cross bar carried by the bowl adjacent to the plane of the upper surface of the cutter disk and provided with a central conical deflector for overhanging the cutter operating gear.

2. A slicer for vegetables and the like having an annular base provided with a diametrical cross bar, a spindle rising from said cross bar at the center of the base, a driving gear mounted upon said spindle, an operating shaft mounted upon the base and having a pinion in engagement with said driving gear, a rotary cutter disk seated upon and secured to the driving gear, and a bowl hingedly mounted upon the base and provided with a central conical deflector disposed in shielding relation with the gear-supported central portion of the cutter disk.

In testimony whereof I affix my signature.

ROBERT J. COX.